(12) United States Patent
Walker

(10) Patent No.: US 7,424,065 B2
(45) Date of Patent: Sep. 9, 2008

(54) APPARATUS AND METHOD FOR ULTRA NARROW BAND WIRELESS COMMUNICATIONS

(76) Inventor: Harold R. Walker, 78 Oliver Ave., Edison, NJ (US) 08820

( * ) Notice: Subject to any disclaimer, the term of this patent is extended or adjusted under 35 U.S.C. 154(b) by 806 days.

(21) Appl. No.: 10/689,911

(22) Filed: Oct. 21, 2003

(65) Prior Publication Data

US 2004/0121731 A1      Jun. 24, 2004

Related U.S. Application Data

(60) Provisional application No. 60/420,239, filed on Oct. 22, 2002.

(51) Int. Cl.
*H04L 27/20* (2006.01)
(52) U.S. Cl. .................................... 375/308
(58) Field of Classification Search ............. 375/130, 375/141, 146, 147, 238, 279, 282, 308, 329, 375/333; 329/304; 332/103; 327/552, 557
See application file for complete search history.

(56) References Cited

U.S. PATENT DOCUMENTS

| | | | | | |
|---|---|---|---|---|---|
| 4,630,285 | A | * | 12/1986 | Dyer et al. ................... | 375/259 |
| 5,027,372 | A | * | 6/1991 | Wong .......................... | 375/308 |
| 5,185,765 | A | * | 2/1993 | Walker ....................... | 375/238 |
| 6,492,865 | B1 | * | 12/2002 | Thomasson ................. | 327/557 |
| 6,775,324 | B1 | * | 8/2004 | Mohan et al. ............... | 375/238 |
| 2002/0000874 | A1 | * | 1/2002 | Thomasson ................. | 327/552 |

* cited by examiner

*Primary Examiner*—Don N Vo
(74) *Attorney, Agent, or Firm*—Daniel L. Dawes

(57) ABSTRACT

A wireless digital transmitting and receiving method and apparatus combining abrupt phase change modulation with an ultra narrow band filter to remove the sidebands, resulting in a single frequency being transmitted to carry the data. The method examines and detects the changes in the carrier product only, after filtering to remove or reduce all sidebands, to obtain a usable signal. Only a single frequency with phase changes is transmitted. An ultra narrow band filter, having a rapid rise time and near zero group delay, passes the near instantaneous modulation changes of phase in the carrier.

27 Claims, 9 Drawing Sheets

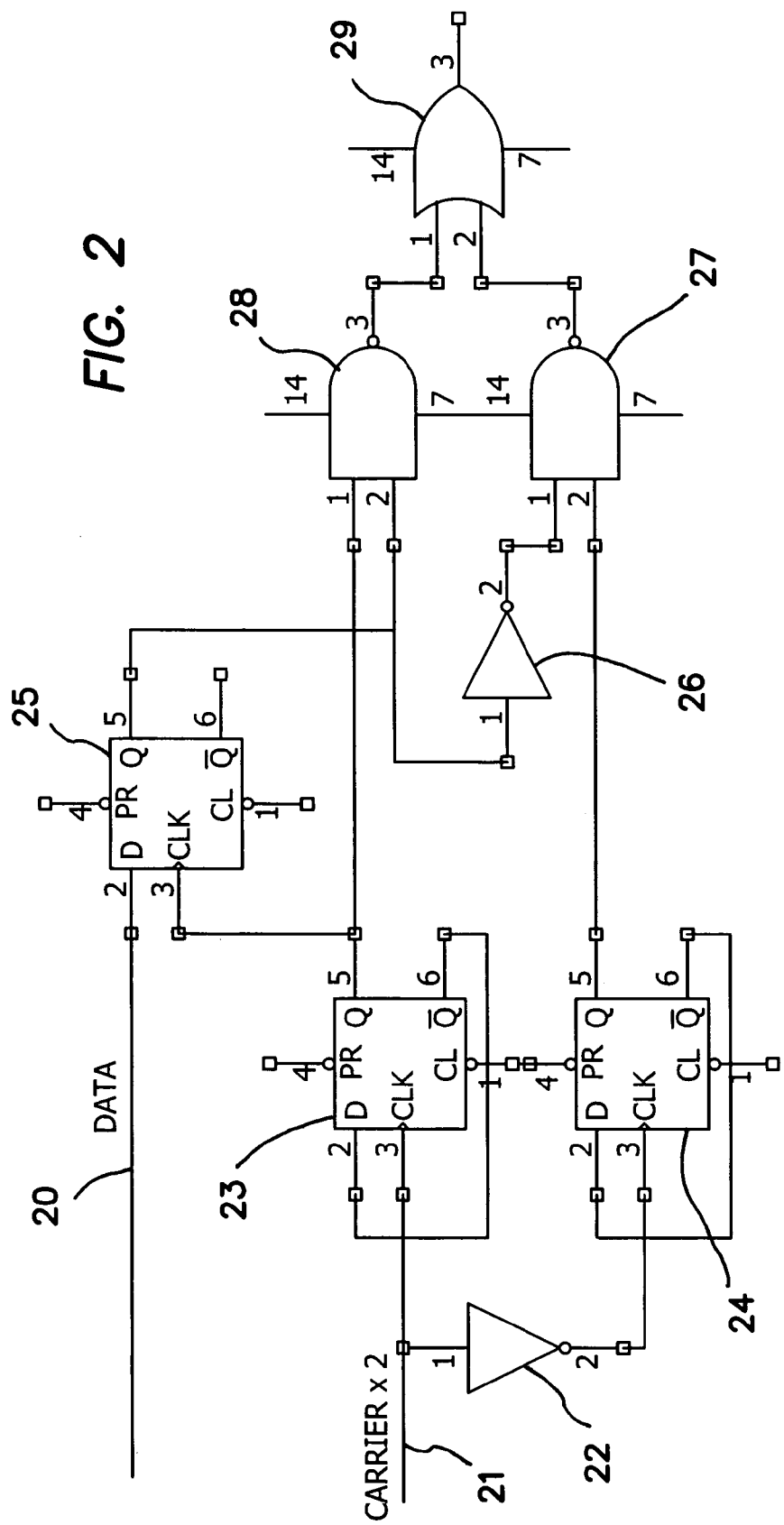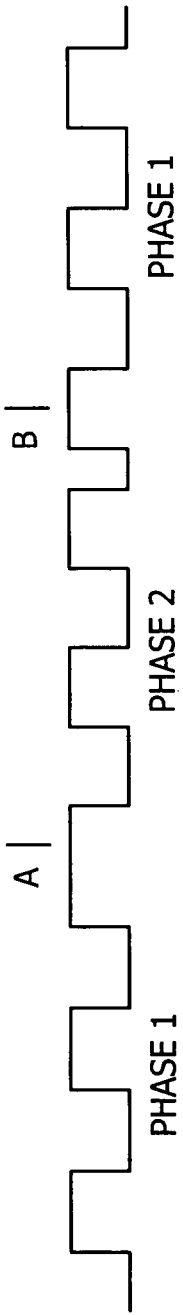

APPARATUS AND METHOD FOR ULTRA NARROW BAND WIRELESS COMMUNICATIONS

RELATED APPLICATIONS

The present application is related to U.S. Provisional Patent Application Ser. No. 60/420,239, filed on Oct. 22, 2002, which is incorporated herein by reference and to which priority is claimed pursuant to 35 USC 119.

BACKGROUND OF THE INVENTION

1. Field of the Invention

The invention relates to the field of digital communication protocols and circuits, and in particular to phase modulation communication protocols and circuits using only the carrier frequency, without sidebands, for information transmittal or reception.

2. Description of the Prior Art

Ultra Narrow Band Methods must separate the carrier from the sidebands, transmitting only one or the other. The object is to obtain a single modulation bearing frequency, or very narrow band of frequencies, that will occupy the least possible transmitted bandwidth. U.S. Pat. Nos. 4,742,532, 5,185,765 and 5,930,303 encode the data stream, then transmit the resulting waveform as a "Single Sideband—Suppressed Carrier—Phase Modulated" signal.

U.S. Pat. No. 6,445,737 modifies the carrier as little as possible and transmits a signal in which the sidebands are suppressed or ignored. In the prior art, other than that described in the references above, every effort is made to use phase shift modulation in a continuous, or smooth phase changing manner, as opposed to the abrupt change manner of the present invention. This prior art has resulted in a modulation concept known as Continuous Phase Frequency Shift Keying (CPFSK), which applies to all the commonly used methods. The CPFSK method results in frequency as well as phase modulation, with the required $J_0$ and $J_1$ Bessel products.

BRIEF SUMMARY OF THE INVENTION

It is the object of the present invention to provide new and novel improvements in phase modulation as disclosed by the embodiments herein.

In one embodiment, a wireless digital transmitting and receiving method is disclosed, which combines abrupt phase change modulation, instead of continuous phase change modulation, with a unique ultra narrow band filter having zero group delay. The filter is capable of passing the abrupt phase transitions, while removing all sidebands, resulting in a single frequency transmission to carry data. Phase angle modulation normally creates a carrier, or $J_0$ Bessel product, plus sidebands, which are Bessel $J_1$ products. Both terms are altered by the level of the phase deviation. Prior art has required that both the $J_0$ and $J_1$ products be present for detection. This is a limitation imposed by the previously available filtering methods and the method used to generate the phase modulation. The present invention is a different method that has no Bessel sideband products and removes, or greatly reduces any other sidebands, while utilizing abrupt phase changes in the carrier alone to carry the modulation.

There are methods in which the carrier ($J_0$) is omitted and all the information is carried in the $J_1$ sideband products. The present method examines and detects the changes in the carrier product only, after filtering to remove or reduce all sidebands, to retain a usable narrow band signal. With this method, only a single frequency with phase changes need be transmitted. A unique ultra narrow band filter, having a rapid rise time and near zero group (envelope) delay, is required to pass the near instantaneous modulation changes of phase in the carrier.

The output of a linear phase detector is found not to be linearly related to the level of any sidebands, which have been greatly reduced or removed in the present invention. The method tolerates interference at levels far in excess of what would have been the $J_1$ sideband levels, indicating that the sidebands are not being used to carry the modulation information, which is not the case with the commonly used phase or frequency modulation methods. Signal-to-noise ratios for a given error rate, are comparable to, or better than, that of the other commonly used methods requiring a full Nyquist bandwidth, since the receiver noise bandwidth is greatly reduced.

More particularly, the invention provides a method for modulating digital data, comprising the steps of abruptly phase shift keying the digital data with a rectangular input signal; and filtering the phase shift keyed digital data with substantially no rise time or group delay to leave only the carrier frequency. The abrupt phase shift keyed digital data has carrier and Fourier sidebands, but no Bessel sidebands. The step of filtering the abrupt phase shift keyed digital data comprises the step of removing the Fourier products of the phase shift keyed digital data. The step of abruptly phase shift keying the digital data inserts substantially all necessary phase modulation information into the carrier alone with an insubstantial amount of any necessary phase modulation information being present in the sidebands. In the illustrated embodiments, the step of abruptly phase shift keying the digital data comprises phase shift keying the digital data according to a baseband signal, which may be in the NRZ format. However, the digital data could be encoded in any two level or two phase baseband format having a shorter phase change pulse period.

The method further comprises receiving such modulated data. It comprises the steps of reducing noise bandwidth with an ultra narrow bandpass filter, detecting abrupt phase changes, and decoding the detected abrupt phase changes into digital ones and zeros along with a corresponding data clock. The invention comprises the step of using a filter having a bandpass narrower than the Nyquist bandwidth of the phase shifted keyed digital data, so that information encoded in the phase changes in the digital data is to be found in the carrier alone. The filter has a bandpass narrower than the Nyquist bandwidth of the phase shifted keyed digital data so that the noise power in the received phase shift keyed digital data is greatly reduced compared to that of conventionally generated phase modulated signals. The method further comprises the step of providing pulses of a polarity indicating a digital one or zero and synchronizing a recovered data clock with the received abrupt phase change pulses.

The invention is also defined as a circuit for phase shift keying a digital data signal comprising a phase change modulator which abruptly changes phase of the digital data signal; and an ultra narrow bandpass filter communicating with the phase change modulator to output a filtered form of the abruptly phase changed digital data signal, which has a substantially zero group or envelope delay. The sideband frequencies created in the modulator, then reduced by the ultra narrow bandpass filter and the phase modulator in combination are Fourier products instead of Bessel products.

The invention further includes a receiver, comprising in turn an ultra narrow bandpass filter to reduce the noise bandwidth, a phase detector to detect the abrupt phase changes, and a decoder to convert the detected abrupt phase changes to digital ones and zeros along with a data clock. The circuit further comprises a storage circuit or flip flop communicating with the detector, which storage circuit is set to hold the last change pulse polarity until a new change pulse is received, where the output pulse polarity indicates a digital zero or one.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIG. 2 is a schematic of an abrupt phase change modulator according to the invention.

FIG. 3 is a waveform diagram of the operation of the abrupt phase change modulator of FIG. 1.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

The present invention combines abrupt phase shift keying with the Walker Shunt filters according to the invention to remove the Fourier sidebands. Unlike commonly used methods, which utilize CPFSK, the present method utilizes abrupt change phase shift keying. The transmitted signal is the carrier alone, which has no theoretical or visible frequency shift. The method makes it possible to use non return-to-zero (NRZ) data as the input, as is done with bi-phase shift key modulation (BPSK), but using 90 degrees or less of total abrupt phase change instead of the 180 degrees used with BPSK. The Walker shunt filters have essentially no rise time and zero group delay, so that they respond to the abrupt phase change edges as well as to the overall phase change. Conventional filters introduce a time delay and cannot respond to the necessary abrupt phase change. This unusual characteristic of these shunt filters, along with the unique characteristics of abrupt phase modulation, is responsible for the performance of this modulation method, which seemingly violates accepted modulation theory.

Figure 1:
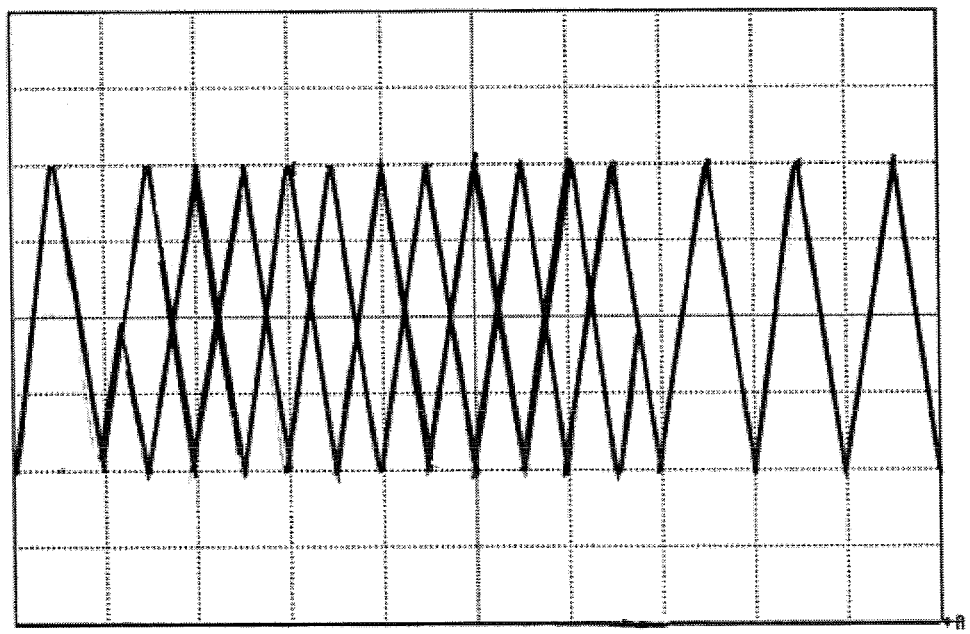
FIG. 1 is an oscilloscope pattern of the abrupt phase change modulation.

FIG. 1 shows an oscilloscope trace of the waveform generated by an abrupt phase change modulator utilizing 180 degrees of phase shift to represent a data pulse.

This is the method of the '737 patent, where the phase reversal is confined to as few reversed cycles as practical. It can be seen that reversing a single cycle results in a missing cycle to produce what is referred to as 'missing cycle modulation', or MCM. Conventional filtering with group delay cannot pass these abrupt phase changes, resulting in loss of phase changes at the leading edge of the data pulse.

In the prior art, as disclosed in the '737 patent, the time period of the phase changes was made as short as possible to reduce the accompanying Fourier sidebands, thereby reducing or eliminating the need for filtering in the transmitter. A phase change pulse having 5% or less of the bit period was required. It has been found that reducing the phase shift to +-45 degrees and using much wider pulse periods can increase the usable data rate.

FIG. 2 is a schematic of a practical embodiment of an abrupt phase change modulator with a phase change of 90 degrees (+-45 degrees ). In order to produce a phase modulation signal with abrupt phase changes, the circuit of FIG. 2, or one equivalent to it, is required. A carrier frequency with phase modulation is derived from a stable oscillator at twice the desired operating frequency and providing an input on line 21. This signal is divided by 2 in the flip flop circuits 23 and 24 to obtain a 90 degree offset. The phase passing through the divider of flip flop 23 is considered a zero degree phase, or phase 1, while a phase inverter 22 causes a delay of ½ cycle in the divide by 2 output of the divider flip flop 24, creating phase 2, which differs by 90 degrees from phase 1. Switching AND gates 27 and 28 whose inputs are coupled to the outputs of flip flops 23 and 24 respectively select the desired phase to represent a digital one or zero with the selected RF phase being passed by the OR gate 29.

A 'D' flip flop 25 is used to synchronize the incoming data with the RF carrier so that the phase cannot be shifted in the middle of an RF cycle. If the zero phase is selected by a digital 1 passing via the 'D' flip flop 223, the zero phase passes via gates 28 and 29 to the transmitter amplifying and conversion circuitry. A digital zero is inverted by the gate 26 to cause gate 27 to be on and the gate 28 to be off, shifting the transmitted carrier phase.

The resulting waveform of the circuit of FIG. 2 is seen in FIG. 3. Starting with a digital 1 as phase 1, or zero degrees, the switching circuits of FIG. 2 cause a delay of ½ cycle as seen at point 'A' when a digital zero is entered. Phase 2 is shifted 90 degrees from phase 1, representing a digital zero. When the data changes back to a digital one, there is a return to phase 1. This causes a loss of ½ cycle and the phase is shifted back to zero degrees. The data input can be NRZ coded, Manchester coded, or any other usable two level baseband code.

In the '737 referenced patent, the phase change was 180 degrees instead of 90 degrees. There is a disadvantage to utilizing 180 degrees in that the phase reversal causes a missing cycle or cycles of the RF sequence. This results in AM instead of PM for MCM, which must be altered to obtain PM, which can be limited. This is accomplished by detuning the bandpass filters to deliberately introduce group delay and thereby reduce the phase shift. This is an undesirable method. The present invention creates the 90 degree phase shift in the modulator, which can be limited, therefore is an improved method.

When using 180 degrees of phase shift and an NRZ encoded input, the result is BPSK modulation, as is well known to those killed in the art. It is difficult to restore an unambiguous reference carrier when using BPSK modulation. The present method, which can use 90 degrees of phase shift instead, makes carrier recovery easier so that NRZ coding can be used without ambiguity.

Figure 4:
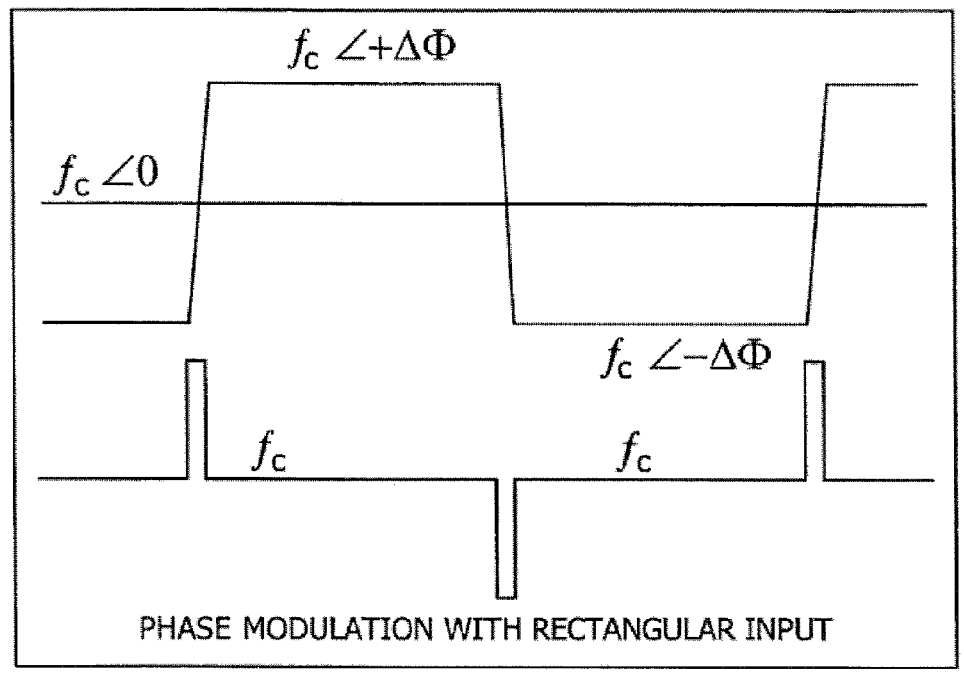
FIG. 4 is a drawing of the narrow band phase modulation frequency change with a rectangular wave input.

When using a rectangular input waveform, there is a large momentary frequency change as noted in Howe, "*Frequency or Phase Modulation*", Editorial note, Wireless Engineer, November 1939, p547, and as seen in the graphs of FIG. 4, otherwise the frequency is constant for ones or zeros, but the phase change follows the input waveform. The spectrum, which is normally transmitted utilizing phase modulation, contains a single frequency spectrum identified as a Bessel $J_0$, accompanied by two sidebands identified as ±Bessel $J_1$ products. Conventional theory holds hat these products are necessary to carry modulation. The $J_0$ product does not vary in frequency, but it does have changes in modulation level as shown by a table of Bessel functions. The phase change of the carrier, or $J_0$ product, has always been ignored or deliberately removed in the prior art. The $J_1$ sideband products are generally considered in the prior art to be where the modulation energy is to be found. They are separated in frequency by an amount equal to the modulating frequency, which is also the Nyquist bandwidth of a narrow band FM or PM system. When a conventional filter is used with an abrupt change phase modulator, the abrupt change is smoothed over and CPFSK results. The abrupt edge is lost to the detecting and decoding circuits. The present method essentially preserves the abrupt leading edge of the data pattern changes, while retaining the zero differential phase change at the maximum and minimum levels of the rectangular encoding signal as seen in FIG. 4.

It has been found that there is sufficient phase information in the abrupt phase changes of the carrier alone, as seen in FIG. 1, to be used to effectively carry the desired digital information. This is accomplished without any change in frequency over most of the modulating change period. Any Fourier sideband products can be reduced to insignificance with a unique ultra narrow band filter, with only a slight loss in detected output level from a phase detector, which is phase locked to the carrier alone. Further, system noise can be much greater than the normally produced $J_1$ products, which is not true when using normal FM or PM. The combination of the abrupt phase change modulator and the unique filter results in a transmitted signal, consisting of the carrier alone, which appears to be a single frequency that carries the desired phase modulation information. The calculated bandwidth efficiency in terms of bits/sec/Hz of filter bandwidth is extremely high.

Digital modulation in the present invention utilizes a coded baseband with abrupt edges, that is, the rise/fall times are as abrupt, or near zero, as possible. Some RC rise time is inevitable, due to slew rates in the ICs and other parts of the circuitry. Referring to FIG. 4, the frequency resulting from a rectangular input is:

$$F=F_{carrier}+\Delta f.$$

$\Delta f$ can be calculated from the basic relationship $\omega t=\phi=2\pi ft$. This can be rewritten in derivative form as $\Delta f=\Delta\phi/2\pi\Delta t$. The rise and fall time t is fixed by the circuit parameters. During the rise and fall times, there is a large $\Delta\phi$, which causes a large $\Delta f$ of very short duration. (about 1 RF cycle). At all other times, $\Delta\phi$ is zero and the frequency $F=F_{carrier}$. A phase detector using $F_{carrier}$ as a phase reference will detect the phase changes as positive and negative voltages.

If $\Delta\phi$ is not zero, there is a frequency change $\Delta f$, with accompanying Bessel sidebands. As long as $\Delta\phi$ is zero, there are no Bessel sidebands.

In the present invention, a phase shift of 90 degrees may be usedm, whereas in the '303 and '737 referenced patents, a phase shift of 180 degrees was used. The phase change without frequency change as illustrated in FIG. 4 applies to the the '303 and '737 patents as well.

Figure 16:
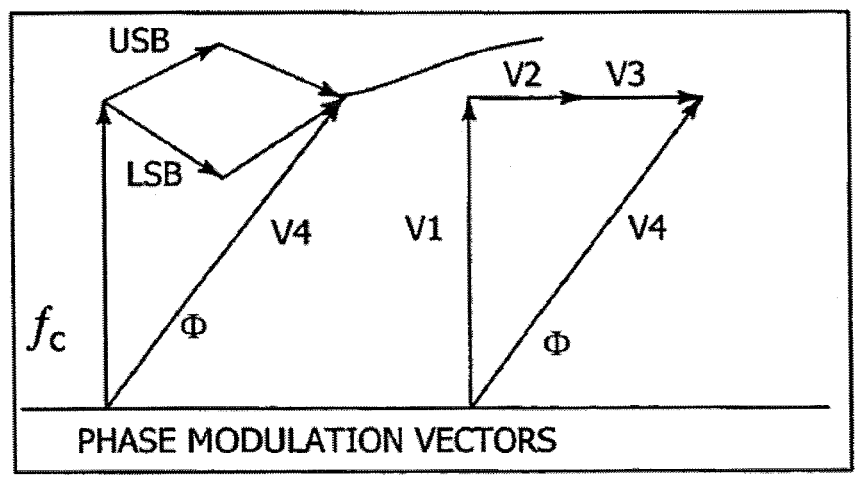
FIG. 16 is a graph showing the vector relationships of the phase modulation vectors.

FIG. 16 shows the vector relationships between sidebands and the resulting phase change angle. On the left side of the figure is a vector diagram of the carrier $f_c$ to which the upper and lower sidebands are added to obtain the vector sum V4. According to accepted practice (e.g., Armstrong Method) using PM to generate FM, a carrier and two sidebands, an upper and a lower sideband, are required. The vectors for the upper and lower sidebands USB and LSB, counter rotate, reaching a maximum in either direction when they are of the same phase. The upper sideband USB is a signal higher in frequency than the carrier by an amount equal to the modulation frequency. The lower sideband LSB is lower in frequency by the same amount. This gives rise to Bessel products which are necessary to cause the vector V4 to shift in phase. There are three or more different frequencies involved to produce the phase shift $\phi$.

When using abrupt phase modulation, the vector equivalents of the USB and LSB are seen as V2 and V3 respectively as shown on the right side of FIG. 16. They must maintain the phase shift $\phi$ at a constant angle, hence they cannot rotate, but can only reverse. If they do not rotate, they are not at different frequencies, but are at the same frequency as the carrier denoted by V1.

Abrupt phase angle modulation does not require any frequencies other than that of the carrier alone. There are no Bessel products or other frequencies required to produce the phase shift. However, the bandpass filters used with it must have near zero group delay.

Figures 5A, 5B, 5C, 5D:
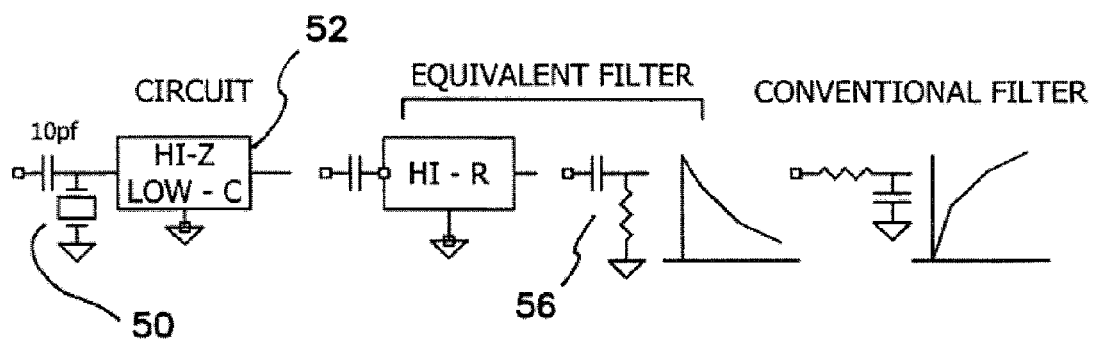
FIGS. 5A, B, C and D are block diagrams of a near zero group delay and rise time filter as employed in the invention.

FIG. 5A is a block diagram of a filter having near zero group (or envelope) delay and near zero rise time to pulsed inputs. Rise time and group delay, are mathematically related. If a signal bearing modulation passes through a crystal used as a bandpass filter, the group delay of the crystal limits the modulation frequency that can be passed. The group delay is calculated from the filter 3 dB bandwidth and phase shift according to the formula:

$$T_g=[\Delta\Phi/2\pi\Delta f].$$

In FIG. 5A the signal does not pass through the crystal 50, but passes directly to the high impedance amplifier 52 with the crystal 50 shunting the amplifier 52 input. At the parallel resonance frequency of the loaded crystal 50, the reactances of the crystal 50 and amplifier 52 input cancel, leaving a very high resistance to ground as diagrammatically depicted in FIG. 5B. The effect is to create an RC differentiator 56 with near zero rise time as diagrammatically depicted in FIG. 5C.

At frequencies off resonance, the impedance is much lower and the combination of small input capacitor and crystal reactance form a voltage divider, passing these off resonant frequencies at a lower level. For a single frequency, such as that of the carrier or $J_0$ product alone, this is a valid comparison, since the zero rise time applies to instantaneous phase changes as well. The circuit is similar to that of a high frequency oscilloscope input probe, which has been compensated for rise time. A conventional filter is an integrator as shown in 5D.

Figure 6:
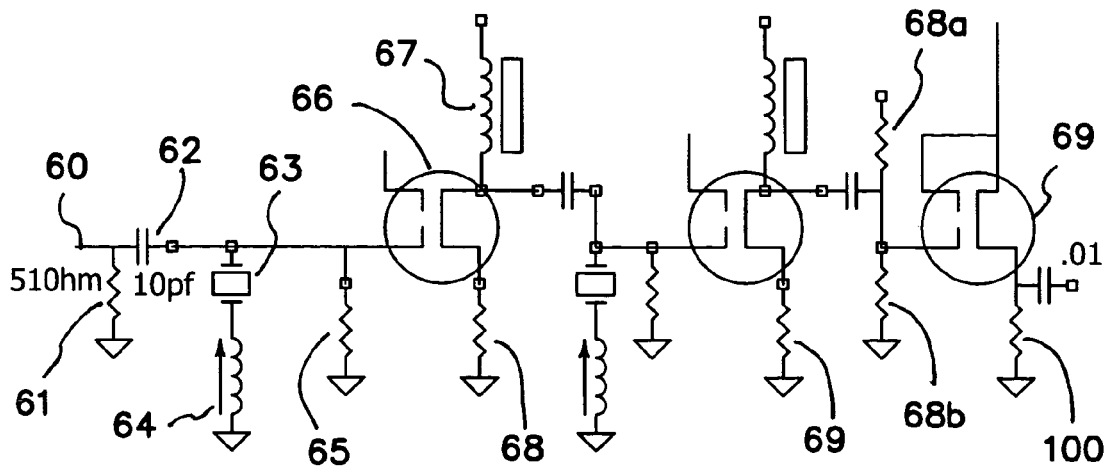
FIG. 6 is a schematic of a practical embodiment of the zero rise time filter of FIGS. 5A, B and C.

FIG. 6 is a practical embodiment of the block diagram in FIG. 5A using cascaded sections 60, 60', 60''. The crystals 63, 63' can be tuned to more accurately center on the single frequency by means of the series inductance 64 shown, or by utilizing a shunting capacitor across the crystal (not shown). The usual way to trim a parallel crystal is to use a shunting capacitor, but the series inductance method yields a wider tuning range and better shoulder reduction in this circuit. At resonance, which includes all reactive components, including those of the high impedance input FET, the input resistance driven by the 5-10 pf capacitor 62 is extremely large. Off resonance, the impedance can be as low as 20-30 Ohms. There is essentially zero rise time for an abrupt change in amplitude or phase with this circuit at resonance for a single frequency.

A 51 ohm resistor 61 is used to terminate a 50 Ohm cable input 60. A 5 or 10 pf capacitor 62 couples the input to the shunting crystal 63 and the high pedance amplifier 66. A DC biasing resistor 65 is used to bias the dual gate FET 66 at 0 volts. The center section 60' in the cascaded circuit is a repeat of the first section 60. The last section is followed by a source follower 60'' to isolate the output.

In order to cascade the filter sections, a very low Q ferrite inductor 67 of the type used to remove RF parasites is used as a drain load. The inductance should be such that the self-resonant frequency with the drain and following circuitry capacity will retain an inductive reactance in a very broad bandwidth, otherwise some group (envelope) delay will be introduced. Allowing additional delays in the cascaded circuit degrades performance.

Figure 7:
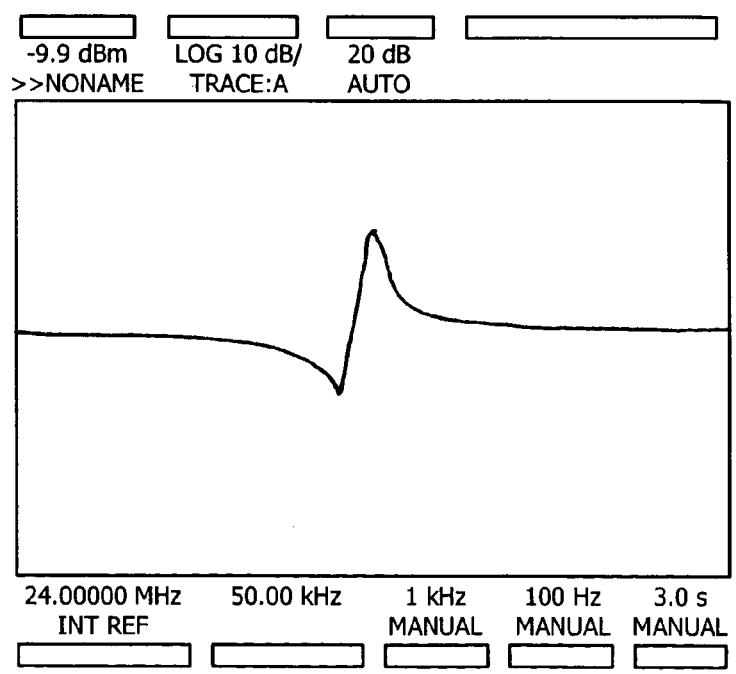
FIG. 7 is an oscilloscope trace of the swept frequency response of the zero rise time filter of FIG. 6.

FIG. 7 shows the spectrum analyzer trace of the swept response of one stage of zero rise time filtering. These stages can be cascaded as in FIG. 6 to increase the shoulder rejection. The 3 dB bandwidth of the filter depends upon the Q of the crystal. For a 25 MHz crystal with a Q=10,000, the 3 dB bandwidth is 2.5 kHz. The calculated group delay using this crystal as a conventional filter is 40 microseconds and the associated rise time is $T_r=0.7/B$, where B is the 3 dB bandwidth of the filter. This is much too large as seen in FIG. 5D to accept a change having a nanosecond duration. The filter shown in FIGS. 5A and 6 does not obey this rise time rule as shown in FIG. 5C, so that it can respond to changes in the tens of nanosecond range.

Figure 8:
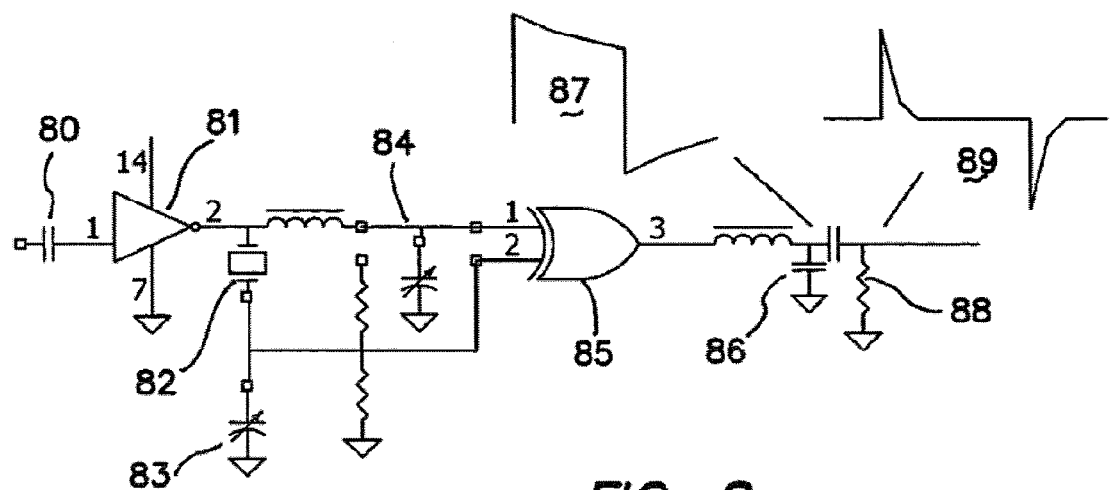
FIG. 8 is a schematic of a phase detector for ultra narrow band phase detection.

FIG. 8 shows a practical embodiment of a phase detector, which can be used to detect phase changes in the ultra narrow band signal. The amplifier 81 raises the ultra narrow band signal to CMOS levels and passes the signal by two different paths to an XOR gate 85. The first path is phase shifted by the LC combination 84, but the abrupt phase change in the signal is not altered. The second path is via the crystal 82 to the XOR gate 85. The crystal 82, which is used in the series mode, is tuned by means of the series capacitor 83 to ground. Since the signal passes though the crystal 82, and not around it as in FIGS. 5A and 6, the signal is subject to the large group delay of the crystal 82, which is 40 microseconds in the above example. This is too long for an abrupt change in the signal to have any phase changing effect, so the XOR gate 85 sees a reference signal at a phase angle somewhere between phase 1 and phase 2, without noticeable phase change when the bit period is less than 1/10 the crystal group delay.

The CMOS XOR gate 85 is a linear phase detector having a near rail-to-rail output for 180 degrees of phase change. The present method can have a 90 degree phase change, so the output may be lower with or without ultra narrow band filtering. The biasing resistors are used to bias the XOR gate 85 input to mid point between Vcc and ground. Types 74HC86 or 74AC86 integrated circuits, or the equivalent FPGA chips with near zero hysteresis, are recommended for this circuit. A low pass filter comprising an inductor and a capacitor combination 86 removes any radio frequencies that pass the XOR gate 85. The detected waveform 87 is seen in the inset above gate 85. The detected level is near that expected for ±45 degree, or ±90 degree phase modulation.

Since phase change edges are the desired modulation component, and the overall signal has a low frequency phase drift with the data pattern, a differentiator 88 is used to exalt the change edges and remove the phase drift. This spike producing differentiator introduces a phase noise improvement factor, known as the 'R' correction factor, which reduces the effect of noise. This well known effect is described in R. E. Best, "Phase Locked Loops". McGraw Hill.

Figure 9:
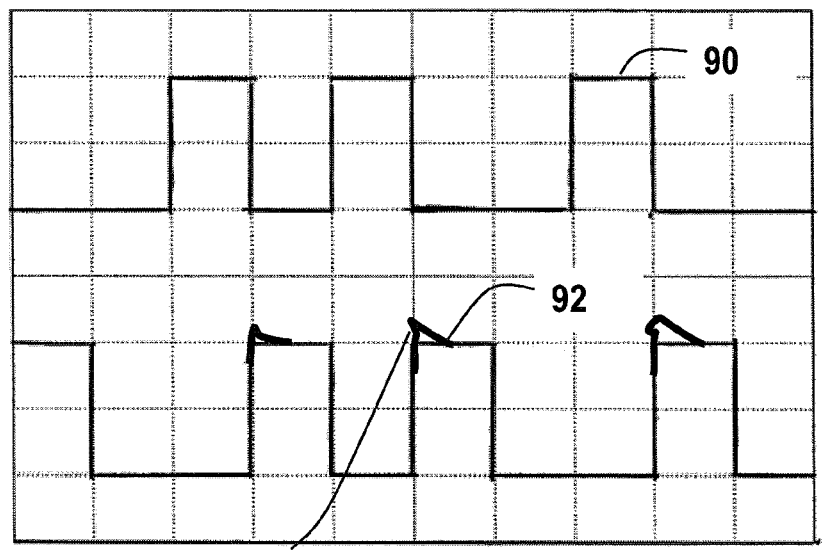
FIG. 9 is an oscilloscope trace of the detected output of the phase detector for NRZ data.

FIG. 9 is an oscilloscope trace that shows the detected output of the phase detector when a 10100100 NRZ bit pattern is used to modulate the carrier. The input bit pattern is shown on the top line 90, and the recovered bit pattern below on line 92. The detected output has leading edge peaks 94, which match the expected XOR gate 85 output for an abrupt phase change. Differentiating reduces, or removes, any low frequency drift effect that accompanies a baseband code with large pulse widths, such as NRZ. Coding methods with shorter pulses than NRZ will also lower the drift.

Figure 10:
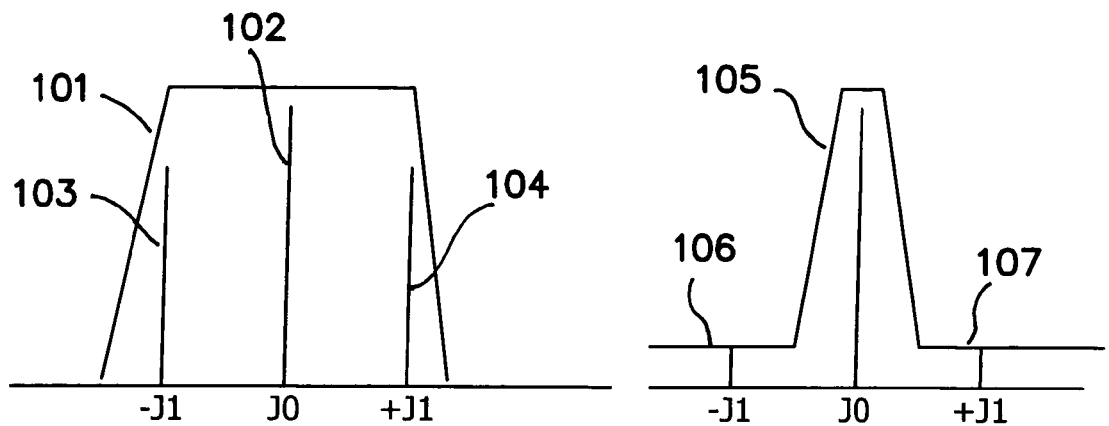
FIG. 10 is a drawing representing the filter bandwidths of present invention on the right hand side and of the prior art on the left hand side.

FIG. 10 is a pair of illustrations that show the relationship between the $J_0$ and $J_1$ products within a Nyquist Filter that are required to cause a phase change. The left side diagram is conventional bandwidth 101 and the right side diagram shows an ultra narrow bandwidth filter 105. The ultra narrow band filter 105 reduces or removes the $J_1$ and any other products so that they do not contribute significantly to the phase changes in the transmitted carrier signal. Conventional theory holds that the $J_0$ and $J_1$ products are both necessary and the filter must have a bandwidth equal to the frequency separating $+J_1$ and $-J_1$, as shown in filter 101, therefore the bandwidth shown in filter 105 should not be usable. The Nyquist bandwidth filter 101 includes both the sidebands 103 and 104 as well as the carrier 102 undiminished in level. The ultra narrow band filter 105 utilized with the present invention has no Bessel sidebands 106 and 107 to remove and reduces the Fourier sidebands, while keeping the carrier at the center at the full power level. This method can only be used with the abrupt phase modulation method of the present invention, which produces no Bessel components.

The sideband level in conventional PM is associated with the modulation index β, so removing or reducing the sidebands decreases β, with an accompanying loss in signal-to-noise ratio. If this were conventional PM, reducing the $J_1$ products to 1/10 prior level (20 dB) should reduce the SNR by a factor of 100, or 40 dB, the phase detector of FIG. 8 should have an output level proportional to the value of β, thus reducing the value of β by a factor of 10. Reducing the $J_1$ products by a factor of 10 should reduce the detected peak to peak voltage output of the current method by 10, or 20 dB.

There are no Bessel products when utilizing the present invention. That the Fourier products do not have this effect is evident from the graph of FIG. 11. The measured output level 111 from the phase detector shows almost no loss as any and all spectral components other than the carrier are reduced. This modulation method produces some Fourier amplitude products, which are AM noise, as well as a phase shifting carrier. The calculated level 112 is for the reduction of these Fourier products, assuming they have the effect of Bessel products.

Figure 11:
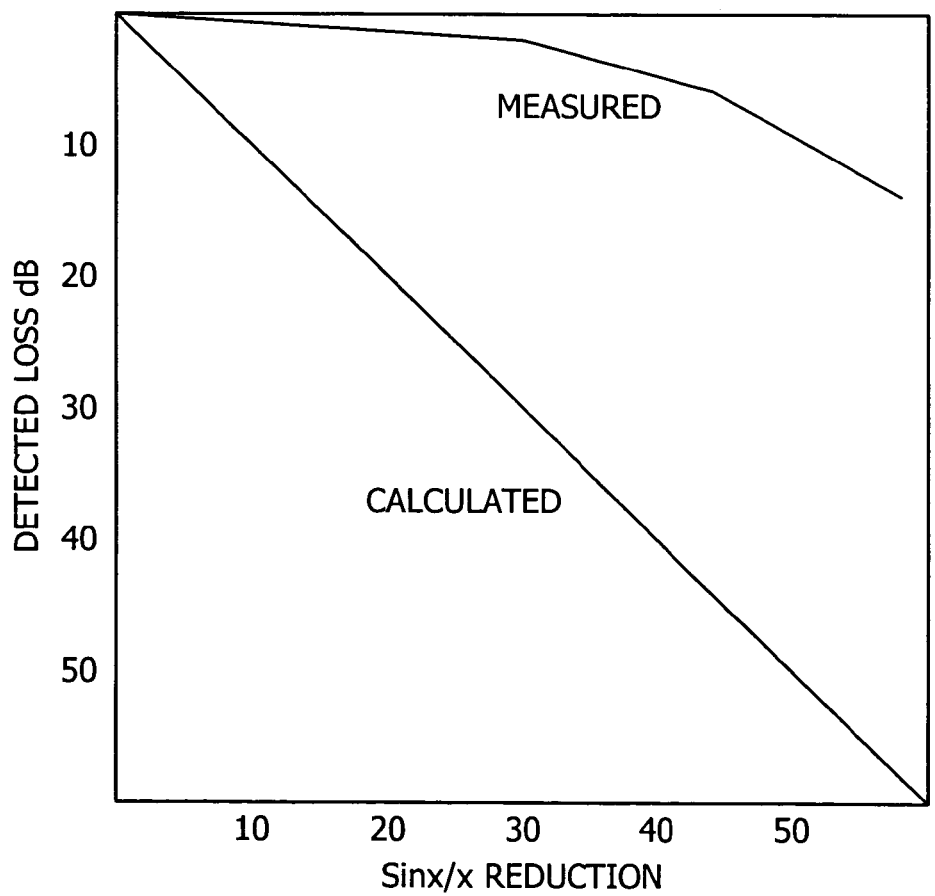
FIG. 11 is a plot of the calculated vs. measured phase detector output.

In making the measurements for FIG. 11, a 90 degree phase shift is used with the multi-section, near-zero-delay filter shown in FIG. 6. The filter tuning is optimized and the noise level reduction per section is used in the calculation. The filter bandwidth is approximately 2 kHz. The sideband level reduction is the same as the shoulder reduction of the filter. The calculated phase angle at the detector should be $2J_1 = \sin\phi$ if Bessel products are present. The measured results at the detector output do not conform to this calculation, since there are no $J_1$ products. The phase detected output 87 remains approximately that for 90 phase modulation, regardless of any sideband reduction.

Some slight group delay, or loss of phase shift, is unavoidable when the filters are cascaded. This is seen in the 'measured' line 111 of FIG. 10. To avoid this loss in detected output, it is preferable to use as few sideband reducing filter sections as permissible by regulatory authorities. The number of filters required can be altered by changing the time periods between phase changes by utilizing different baseband codes.

Figure 12:
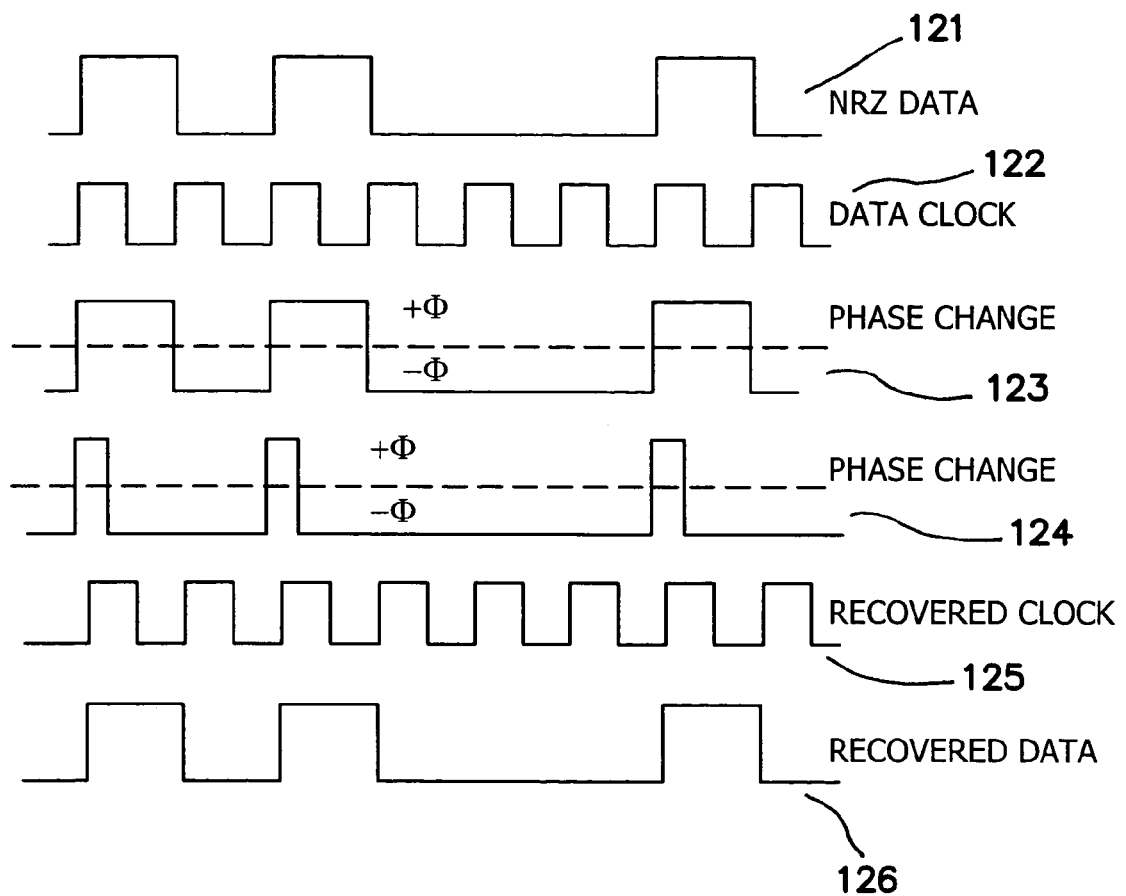
FIG. 12 is a plot showing the modulation and decoding timing.

FIG. 12 shows the relationship between the input data, the phase changes produced by the abrupt phase modulator and how the received data is decoded. Line 121 shows the input NRZ data pattern, with the associated data clock on line 122. Utilizing the NRZ pattern to cause the abrupt phase shifts, the result is seen on line 123. When a much shorter phase change period is used, the result is seen on line 124. The decoder circuit creates a restored clock, which is shifted slightly in phase to sample the positive phase changes and restore the original data pattern.

Figure 13:
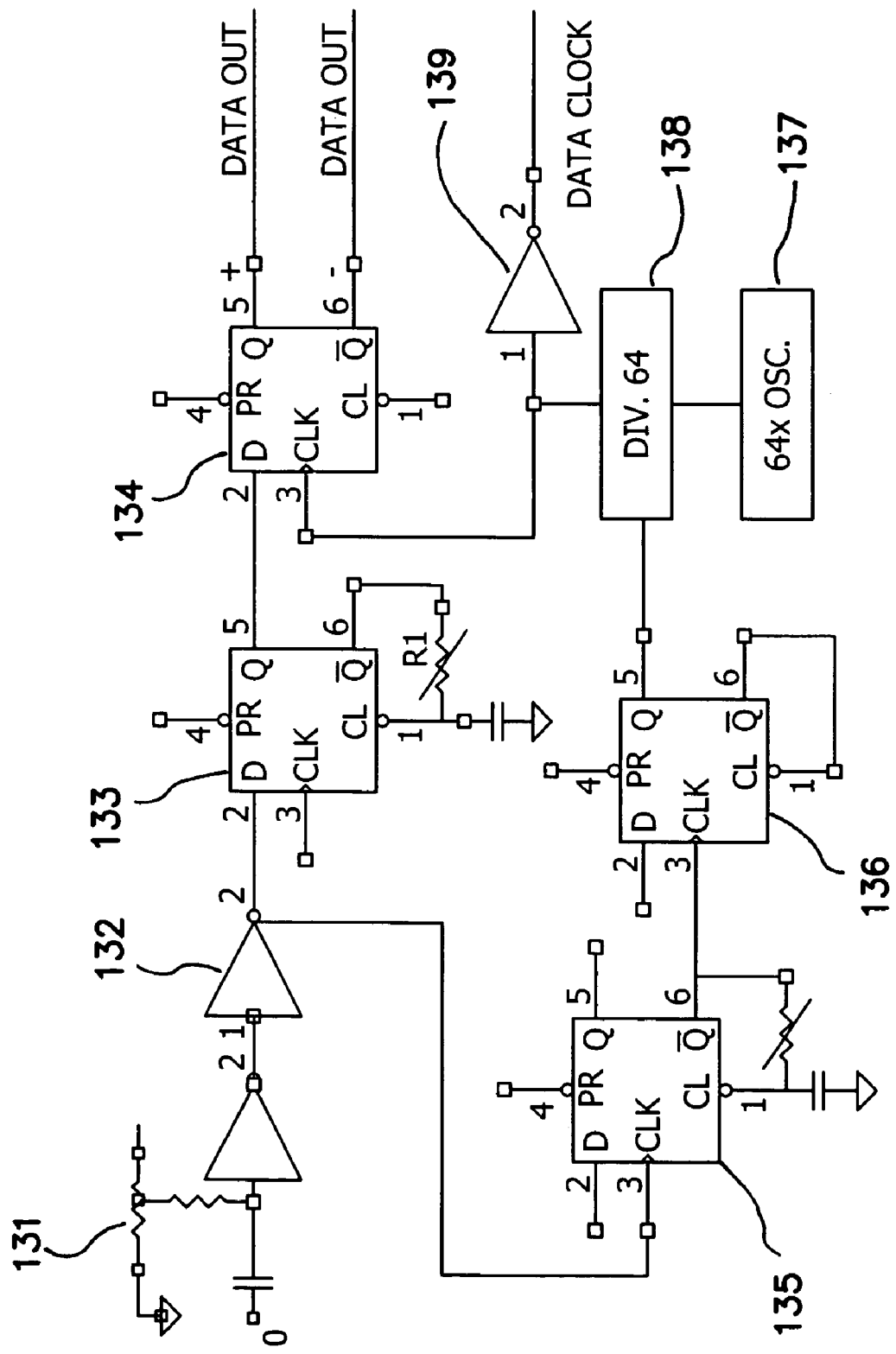
FIG. 13 is a schematic of the decoder circuitry.

FIG. 13 is a schematic, which shows one of several decoding circuits applicable to the present invention. Other decoding circuits applicable to other baseband codes are to be found in the '737 patent.

When using the NRZ baseband code, the detected signal from the phase detector in FIG. 8 is the rectangular pattern seen at 87. This pattern is squared up by the gates 132 to present a replica of the NRZ data at the D input to the D flip flop 134. Flip flop (FF) 133 is omitted for NRZ data. The flip flop 134 passes the data in synchronism with the restored clock. Output data of both polarities is available.

When a short pulse shift time is used, as in FIG. 12 line 124, FF 133 is employed as a one shot device to create a pulse having a duration slightly less than one bit period. Any very short duration pulses as shown on line 124 are stretched for a more stable reading by the recovered clock. These stretched pulses are then sampled by the FF 134 to obtain ones and zeros. With short pulses, the gates 132 can be omitted and the differentiated pulses 89 from FIG. 8 can be used to drive FF 133. This takes advantage of the phase noise improvement, or 'R' factor.

The leading edges of the detected pulses are used to trigger a short duration time delay one shot 135. This time delayed pulse drives a spiking one shot 136 that is used to reset the counter 138. A crystal controlled clock oscillator at 32 or 64 times the clock frequency is used as a stable source.

Figure 14:
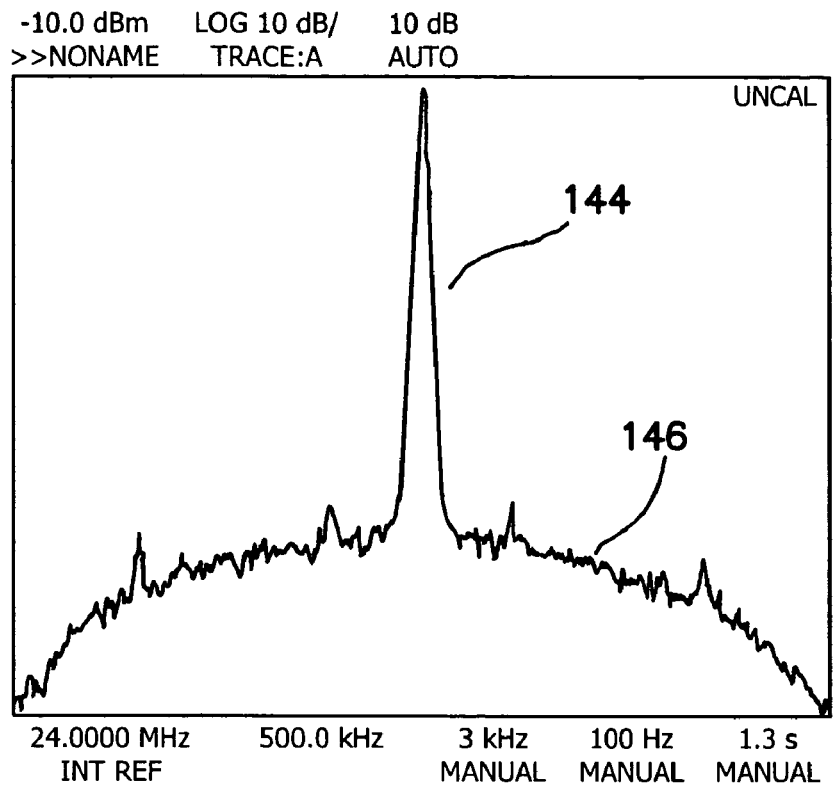
FIG. 14 is a plot showing the spectrum utilizing random NRZ data.

FIG. 14 is a plot which shows the spectrum of a random data NRZ encoded signal, utilizing the modulator of FIG. 1 and the filter of FIG. 6. The strong central spike 144 is the carrier component carrying the phase modulated information. The lower level hump 146 is the Fourier sidebands, which results from the possible modulation frequencies and DC level creep. The detected phase change level seen in FIG. 11 is much greater than the Fourier sidebands 146 could cause. These Fourier sidebands 146 represent AM noise, which can be reduced further by additional stages of filtering.

The BPSK modulation method, which is well known to those skilled in the art, has a 180 (+−90) degree phase shift. It is generally used with the carrier suppressed to improve the signal to noise ratio. This combination makes it very difficult to restore a carrier. The methods presently in use utilize the sidebands to restore a carrier which is ambiguous, that is it can be in phase or out of phase with the sidebands. This necessitates the use of 'differential coding' in the data stream, which makes it possible to use either carrier phase. This problem is solved in the commonly used CPFSK method called 'Gaussian Minimum Shift Keying', where phase shifts in multiples of 90 degrees are used. GMSK still relies upon the Bessel sidebands for detection and has a usable bandwidth only slightly better than that of BPSK.

The present method also utilizes a modulation index less than +−90 degrees, as does GMSK, but the Bessel sidebands are neither generated nor present in the transmitted signal. The noise bandwidth is much less than for BPSK or GMSK, hence the signal to noise ratio is greatly improved.

Figure 15:
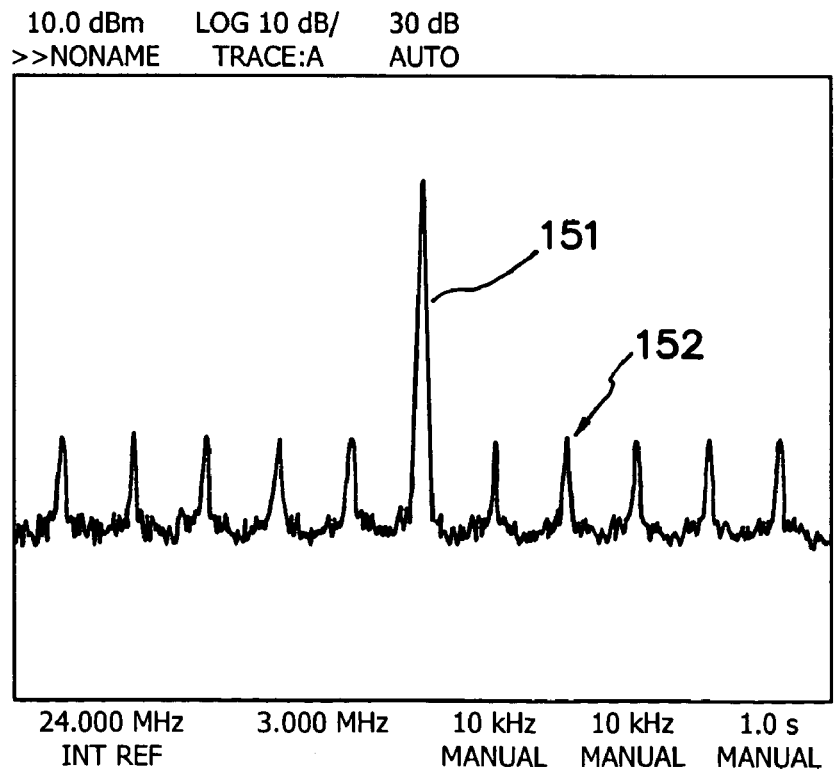
FIG. 15 is a plot showing the spectrum utilizing shorter baseband pulses than NRZ.

A phase change of 1 or 2 RF cycles as disclosed in the '737 patent results in the spectrum analyzer plot shown in FIG. 15. The carrier bearing the phase change is seen at 151. The removable Fourier sin x/x components 152 are seen as individual frequencies. The peak level of these individual frequencies is $-20\text{Log}_{10}(T/t)$, where T is the bit period and t is the period of the phase change. The RMS value is twice that, or $-40\text{Log}_{10}(T/t)$. The RMS value is so low that a bandpass filter is often not required at the transmitter.

If digital ones only are used to cause a phase shift, the RMS value is 6 dB lower than calculated above. The values above are for 180 degree phase shifts. For 90 degree phase shifts, the value is 3 dB lower. This low RMS value often makes it possible to omit bandpass filtering in the transmitter.

An NRZ baseband code, with a phase change covering an entire bit period, requires the most transmitter filtering to meet regulatory requirements, while the 1-2 cycle change code of the '737 patent requires the least. Therefore, a larger number of cycles than 1-2 can be used until the sin x/x pulses no longer are below the regulatory level. In this manner the required number of filter sections can be reduced while retaining the detected output level. This is also a commercial advantage, since the cost and manufacturing complexity is reduced.

Utilizing as few cycles as possible results in a method which has the best multi-path response. Measurements have shown the '737 method to be superior to any of the CPFSK methods.

The maximum data rate possible is related to the ability of the filter and phase detector to resolve a few cycles of change in the transmitted signal stream. If the advantages of the '737 patent are to be retained, this results in the lowest maximum data rate. If on the other hand, NRZ coding can be used, the maximum possible rate is obtained. A compromise must be made between the amount of transmitter and receiver filtering required and the data rate.

There is a generally accepted equation for signal-to-noise ratio (SNR ). See K. Feher, "*Wireless Digital Communications*", Prentice Hall.

$$SNR = \beta^2[\text{bit rate/filter bandwidth}] E_b/\eta$$

$$SNR = \beta^2 C/N$$

Where C is Signal Power, N is Noise Power, $E_b$ is bit energy and η is noise power per unit bandwidth. β is the phase modulation angle.

Considerable SNR loss is overcome in the present method by using very narrow bandwidth filters, since noise varies with bandwidth used. The term 'bit rate/filter bandwidth' is known as 'processing gain', which can overcome the losses due to $β^2$. However, the relationship between the phase angle β calculated from $2J_1=\sin \phi$ and the detected output is not valid in the present case, as shown in FIG. 11. The detected signal indicates that β is ±45 degrees, or +−0.79 radians. The SNR, as calculated for this β value and the very narrow bandwidth filters, is therefore better than for BPSK modulation, which is considered a comparison standard.

Ordinarily, if noise or an interfering signal exceeds the level of either $J_1$ component, the signal is destroyed. This has been found not to be true using the circuits illustrating the present invention. In FIG. 10 any noise within the bandwidth of the filter 101 exceeding a $J_1$ product will destroy the signal. In FIG. 10 in filter 105, noise can be far in excess of the reduced sidebands 106 and 107. The desired phase modulation signal is obviously confined to the carrier.

It is obvious to those skilled in the art that any signaling method, or baseband coding method, that utilizes two phases, can be used with the present invention by making appropriate changes in the encoder and decoder circuits.

Many alterations and modifications may be made by those skilled in the art without departing from the spirit and scope of the invention. Therefore, it must be understood that the illustrated embodiment has been set forth only for purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the defined meanings. Thus if an element can be understood in the context of this specification as including more than one meaning, then its use in a claim must be understood as being generic to all possible meanings supported by the specification and by the words itself.

The definitions of the words or elements of the following claims are therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below, or that a single element may be substituted for two or more elements in a claim.

Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

I claim:

1. A radio frequency transmitting method for the transmission of digital data, comprising:
   abrupt phase shift keying the digital data; and
   filtering the abrupt phase shift keyed digital data with a bandpass filter having essentially no envelope delay to the digital data to be passed.

2. The method of claim 1 where the abrupt phase shift keyed digital data results in a carrier bearing phase shift information and removable Fourier sidebands, which do not contribute to the phase modulation angle.

3. The method of claim 2 where filtering the phase shift keyed digital data reduces the modulation sidebands, which are Fourier amplitude modulation products only.

4. The method of claim 1 where the phase shift keyed digital data has a carrier and Fourier sidebands, and where abruptly phase shift keying the digital data inserts substantially all necessary phase modulation information into the carrier alone with an insubstantial amount of any necessary phase modulation information inserted into the Fourier sidebands.

5. The method of claim 1 where abruptly phase shift keying the digital data comprises phase shift keying the digital data in the NRZ format.

6. The method of claims 1 or 5 where any two phase baseband format or code is employed to abruptly phase shift the carrier.

7. The method of claim 1, further comprising:
   reducing the noise bandwidth with an ultra narrow bandpass filter;
   detecting abrupt phase changes; and
   decoding the detected abrupt phase changes into digital ones and zeros along with a corresponding data clock.

8. The method of claim 7 where the abrupt phase shift keyed digital signal does not have a Nyquist bandwidth resulting from Bessel products and wherein reducing noise bandwidth with an ultra narrow bandpass filters comprises using a filter having a bandpass narrower than the Nyquist bandwidth of the phase shifted keyed digital data so that information encoded in the phase changes in the digital data is found in the carrier alone.

9. The method of claim 7 where the abrupt phase shift keyed digital signal does not have a Nyquist bandwidth and wherein reducing the noise bandwidth with ultra narrow bandpass filters comprises using a filter having a bandpass narrower than the Nyquist bandwidth of the phase shifted keyed digital signal so that the noise power in the received phase shifted keyed digital data is greatly reduced compared to that of conventionally generated phase modulated signals.

10. The method of claims 1 or 7 further comprising utilizing abrupt phase change pulses of different phase angles to indicate a digital one or zero, wherein the phase angle changes have values other than 180 degrees.

11. The method of claim 7 further comprising synchronizing a recovered data clock with the received abrupt phase change pulses.

12. The method of claim 1, wherein filtering the abrupt phase shift keyed digital data with a bandpass filter comprises using a shunt filter comprising a crystal resonator, and wherein the digital signal does not pass through the crystal.

13. The method of claim 1, wherein filtering the digital data with a bandpass filter having essentially no envelope delay results in all sidebands being substantially removed, and substantially all necessary phase information being retained in a carrier.

14. The method of claim 1, wherein abrupt phase shift keying the digital data comprises abruptly switching a carrier of the digital data in phase to preclude frequency deviation over a data switch period, and wherein abruptly switching the carrier in phase is in response to information bearing data pattern in the digital data, and wherein the filter passes the abrupt phase switched carrier with minimum loss of phase.

15. The method of claim 1, wherein filtering the digital data with a bandpass filter comprises using a shunt filter comprising a crystal resonator operated in the parallel mode, so as to represent an infinite shunt impedance to the input at the single frequency and a lower finite shunting complex impedance at all other frequencies.

16. A circuit for phase shift keying a digital data signal carrier bearing information, the circuit comprising:
   an abrupt phase change modulator which abruptly changes phase of the digital data signal carrier; and
   an ultra narrow bandpass filter which has a substantially zero envelope delay communicating with the phase change modulator to output a bandpass filtered form of the abruptly phase changed digital data signal.

17. The circuit of claim 16 wherein the digital data signal has a carrier frequency plus sideband frequencies which are not used, and where the ultra narrow bandpass filter and the phase modulator in combination reduce the level of said sideband frequencies.

18. The circuit of claim 17 where the sideband frequencies reduced by the ultra narrow bandpass filter and the phase modulator in combination are Fourier products.

19. The circuit of claim 17 wherein the digital data signal carrier is modulated by the phase change modulator to retain an information content, and wherein the sideband frequencies reduced by the ultra narrow bandpass filter and the phase modulator in combination have substantially no necessary information content, the carrier having substantially all the necessary information content.

20. The circuit of claim 16 where the phase change modulator changes the phase of data according to the NRZ format.

21. The circuit of claim 16 where the phase change modulator changes the phase of the signal according to any two phase format or baseband code.

22. The circuit of claim 16 further comprising a receiver including an ultra narrow band pass filter to reduce the noise bandwidth, a limiter, a phase detector to detect the abrupt phase changes, and a decoder to convert the detected abrupt phase changes to digital ones and zeros along with a data clock.

23. The circuit of claim 22 wherein the digital data signal carrier bearing the information does not comply with Nyquist rules for bandwidth and wherein the ultra narrow bandpass filter in the receiver has a noise bandwidth much narrower than the Nyquist bandwidth, causing the noise power in the receiver to be greatly reduced compared to that of conventionally generated PM signals.

24. The circuit of claim 22 further comprising processing circuitry to provide output pulses of a polarity indicating a digital one or zero.

25. The circuit of claim 24 where the processing circuitry provides pulses processed to provide a phase noise improvement.

26. The circuit of claim 25 further comprising a storage circuit communicating with a phase detector, which storage circuit is set to hold the last change pulse polarity until a new change pulse is received, where the pulse polarity indicates a digital zero or one.

27. The circuit of claim 22 further comprising a clock recovery means to synchronize a recovered data clock with the abrupt phase change pulses received by the receiver.

* * * * *